US011313718B2

(12) United States Patent
Piech et al.

(10) Patent No.: US 11,313,718 B2
(45) Date of Patent: Apr. 26, 2022

(54) SEMICONDUCTOR FILM AND PHOTOTUBE LIGHT DETECTOR

(71) Applicant: Carrier Corporation, Palm Beach Gardens, FL (US)

(72) Inventors: Marcin Piech, East Hampton, CT (US); Peter R. Harris, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 59 days.

(21) Appl. No.: 16/613,324

(22) PCT Filed: May 25, 2018

(86) PCT No.: PCT/US2018/034630
§ 371 (c)(1),
(2) Date: Nov. 13, 2019

(87) PCT Pub. No.: WO2018/222528
PCT Pub. Date: Dec. 6, 2018

(65) Prior Publication Data
US 2020/0200598 A1    Jun. 25, 2020

Related U.S. Application Data

(60) Provisional application No. 62/512,546, filed on May 30, 2017.

(51) Int. Cl.
*G01J 1/42* (2006.01)
*G01J 1/44* (2006.01)
*G01J 5/00* (2006.01)

(52) U.S. Cl.
CPC ............ *G01J 1/429* (2013.01); *G01J 1/4228* (2013.01); *G01J 1/44* (2013.01); *G01J 5/0018* (2013.01); *G01J 2001/4446* (2013.01)

(58) Field of Classification Search
CPC .. G01J 1/429; G01J 1/4228; G01J 1/44; G01J 5/0018; G01J 2001/4446; G01J 1/08;
(Continued)

(56) References Cited

U.S. PATENT DOCUMENTS

| 4,578,583 | A |   | 3/1986 | Ciammaichella et al. |
| 5,319,193 | A | * | 6/1994 | Rogers .................... H01J 47/02 250/214.1 |

(Continued)

FOREIGN PATENT DOCUMENTS

| CN | 104729703 A | 6/2015 |
| CN | 105789377 A | 7/2016 |

(Continued)

OTHER PUBLICATIONS

ISR/WO, Issued Nov. 19, 2018, 19 pages.
(Continued)

*Primary Examiner* — Thanh Luu
*Assistant Examiner* — Monica T Taba
(74) *Attorney, Agent, or Firm* — Cantor Colburn LLP

(57) ABSTRACT

A light detection system is provided for association with a light source. The light detection system includes a light detector and circuitry. The light detector includes semiconductor film and phototube devices and is disposed with at least one line-of-sight (LOS) to the light source. The circuitry is coupled to the light detector and the light detector and the circuitry are configured to cooperatively identify a presence and a characteristic of a light emission event at the light source.

15 Claims, 7 Drawing Sheets

(58) Field of Classification Search
CPC ......... G01J 1/4257; F23M 2900/11041; F23N 5/00; F23N 5/082
See application file for complete search history.

(56) References Cited

U.S. PATENT DOCUMENTS

| | | | |
|---|---|---|---|
| 5,339,070 A | 8/1994 | Yalowitz et al. | |
| 5,471,051 A | 11/1995 | Niigaki et al. | |
| 5,923,045 A | 7/1999 | Nihashi et al. | |
| 6,246,099 B1 | 6/2001 | Pauchard et al. | |
| 7,030,406 B2 | 4/2006 | Edamura et al. | |
| 7,132,668 B2 | 11/2006 | Vispute et al. | |
| 7,381,966 B2 | 6/2008 | Starikov et al. | |
| 7,525,131 B2 | 4/2009 | Sumiya et al. | |
| 7,566,875 B2 | 7/2009 | Starikov | |
| 7,602,122 B2 | 10/2009 | Kyushima et al. | |
| 7,741,759 B2 | 6/2010 | Sugiyama et al. | |
| 7,816,866 B2 | 10/2010 | Nakajima et al. | |
| 7,867,807 B2 | 1/2011 | Kishita et al. | |
| 7,906,725 B2 | 3/2011 | Shimoi et al. | |
| 8,482,197 B2 | 7/2013 | Niigaki et al. | |
| 9,212,992 B2 | 12/2015 | McNutt | |
| 9,601,299 B2 | 3/2017 | Chuang et al. | |
| 2003/0160176 A1* | 8/2003 | Vispute | H01L 31/0288 250/372 |
| 2008/0042563 A1 | 2/2008 | Niigaki et al. | |
| 2008/0121928 A1 | 5/2008 | Niigaki et al. | |
| 2008/0128632 A1* | 6/2008 | Lee | G01J 1/429 250/372 |
| 2017/0030768 A1 | 2/2017 | Dardona et al. | |
| 2017/0033150 A1 | 2/2017 | Willigan et al. | |
| 2017/0033256 A1 | 2/2017 | Williagan et al. | |

FOREIGN PATENT DOCUMENTS

| | | | | |
|---|---|---|---|---|
| GB | 1342130 A | | 12/1973 | |
| JP | S60180052 A | | 9/1985 | |
| JP | H0750149 A | | 2/1995 | |
| JP | H0896705 A | | 4/1996 | |
| JP | 2011176090 A | * | 9/2011 | ............ G01J 1/429 |
| WO | 1999016098 A1 | | 4/1999 | |

OTHER PUBLICATIONS

Rogalski et al."Semiconductor Ultraviolet Photodetectors", Opto-Electr., 1996, 18 pages.

Sang et al., "A Comprehensive Review of Semiconductor Ultraviolet Photodetectors: From Thin Film to One-Dimensional Nanostructures", Sensors, 2013, 37 pages.

* cited by examiner

SEMICONDUCTOR FILM AND PHOTOTUBE LIGHT DETECTOR

CROSS-REFERENCE TO RELATED APPLICATIONS

This application claims the benefit of PCT/US2018/034630 filed May 25, 2018, which claims priority to U.S. Provisional Application No. 62/512,546 filed May 30, 2017, which is incorporated herein by reference in its entirety.

BACKGROUND

The following description relates to semiconductor films and phototube light detectors and, more particularly, to a combination of a semiconductor film and a phototube light detector.

Ultraviolet (UV) flame detection requires a sharp wavelength cutoff so that incident sunlight will not trigger a false alarm. Phototubes based on applications of photoelectric effect can meet this requirement but require high voltages, are relatively high cost, fragile and oftentimes do not accurately quantify incident UV light intensity. On the other hand, solid state semiconductor film devices measure relative light intensities but suffer from limited sensitivity and selectivity. Thus, achieving a sufficiently sharp absorption cutoff at solar wavelengths to prevent false-positive alarms remains a challenge for certain sensor types.

BRIEF DESCRIPTION

According to one aspect of the disclosure, a light detection system is provided for association with a light source. The light detection system includes a light detector and circuitry. The light detector includes semiconductor film and phototube devices and is disposed with at least one line-of-sight (LOS) to the light source. The circuitry is coupled to the light detector and the light detector and the circuitry are configured to cooperatively identify a presence and a characteristic of a light emission event at the light source.

In accordance with additional or alternative embodiments, the light source is provided as a plurality of light sources and the light detector is provided as one or more light detectors with at least one respective LOSs to corresponding ones or more of the plurality of light sources.

In accordance with additional or alternative embodiments, the characteristic of the light emission event includes a frequency of light produced by the light emission event.

In accordance with additional or alternative embodiments, the circuitry includes a first loop configured to identify the presence of the light emission event from a first photoelectric phenomenon of the light detector and a second loop configured to identify the characteristic of the light emission event from a second photoelectric phenomenon of the light detector.

In accordance with additional or alternative embodiments, the light detector includes a first wafer having opposed first and second major surfaces, a photosensitive semiconductor film disposed on the second major surface of the first wafer, interdigital electrodes (IDEs) partially formed on the photosensitive semiconductor film, a second wafer having opposed first and second major surfaces and a top electrode disposed on the first major surface of the second wafer. The first and second wafers are bonded such that the respective second and first major surfaces of the first and second wafers face each other with a cavity defined between the respective second and first major surfaces of the first and second wafers. The cavity is chargeable with gas supportive of photoelectric phenomena between the IDEs and the top electrode.

In accordance with additional or alternative embodiments, the first and second wafers each include at least one or more of silicon, oxide on silicon, quartz, sapphire, fused silica and ultraviolet (UV) transparent glass.

In accordance with additional or alternative embodiments, the cavity is hermetically sealed.

In accordance with additional or alternative embodiments, the first and second wafers are frit bonded, anodically bonded or glued.

In accordance with additional or alternative embodiments, a distance between the IDEs and the top electrode is anywhere from being similar to a pitch of the IDEs to being substantially larger than the pitch of the IDEs.

In accordance with additional or alternative embodiments, both of the IDEs and the top electrode are metallic.

In accordance with additional or alternative embodiments, the top electrode has an IDE structure and the light detector further includes a photosensitive semiconductor film interposed between the IDE structure of the top electrode and the first major surface of the second wafer.

According to another aspect of the disclosure, a light detector is provided and includes a first wafer having opposed first and second major surfaces, a photosensitive semiconductor film disposed on the second major surface of the first wafer, interdigital electrodes (IDEs) partially formed on the photosensitive semiconductor film, a second wafer having opposed first and second major surfaces and a top electrode disposed on the first major surface of the second wafer. The first and second wafers are bonded such that the respective second and first major surfaces of the first and second wafers face each other with a cavity defined between the respective second and first major surfaces of the first and second wafers. The cavity is chargeable with gas supportive of photoelectric phenomena between the IDEs and the top electrode.

In accordance with additional or alternative embodiments, at least the first and second wafers have similar coefficients of thermal expansion (CTEs).

In accordance with additional or alternative embodiments, the first and second wafers each include at least one or more of silicon, oxide on silicon, quartz, sapphire, fused silica and ultraviolet (UV) transparent glass.

In accordance with additional or alternative embodiments, the cavity is hermetically sealed.

In accordance with additional or alternative embodiments, the first and second wafers are frit bonded, anodically bonded or glued.

In accordance with additional or alternative embodiments, a distance between the IDEs and the top electrode is anywhere from being similar to a pitch of the IDEs to being substantially larger than the pitch of the IDEs.

In accordance with additional or alternative embodiments, both of the IDEs and the top electrode are metallic.

In accordance with additional or alternative embodiments, the top electrode has an IDE structure and the light detector further includes a photosensitive semiconductor film interposed between the IDE structure of the top electrode and the first major surface of the second wafer.

According to yet another aspect of the disclosure, a method of assembling a light detector is provided and includes disposing a photosensitive semiconductor film on a major surface of a first wafer, partially forming interdigital electrodes (IDEs) on the photosensitive semiconductor film, disposing a top electrode on a major surface of a second wafer, bonding the first and second wafers such that the respective major surfaces face each other with a cavity defined therebetween and charging the cavity with gas supportive of photoelectric phenomena between the IDEs and the top electrode.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
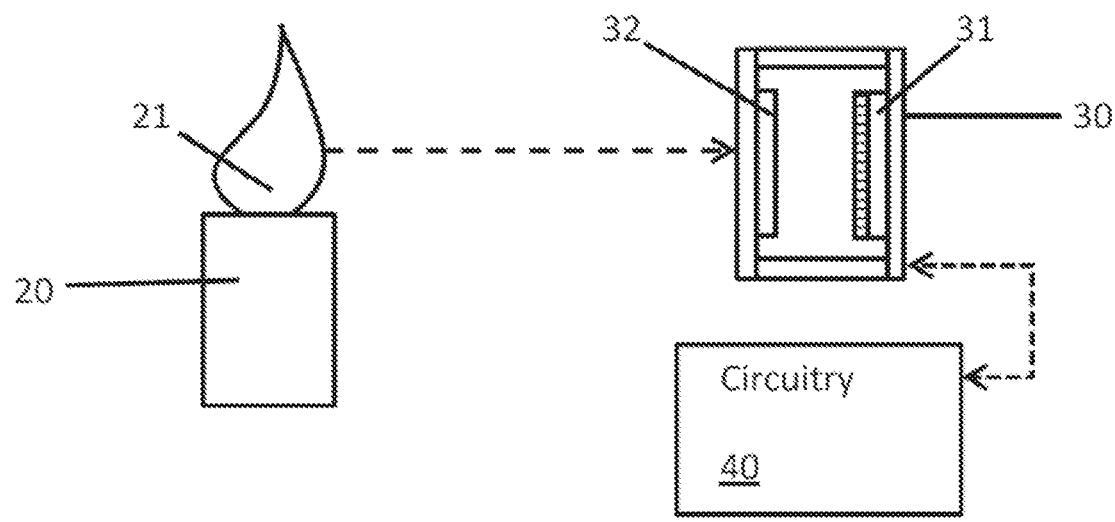
FIG. 1 is a schematic diagram illustrating a light detection system in accordance with embodiments.

Combining semiconductor films with phototubes offers sufficient sensitivity, solar light rejection and measurement dynamic range ideal for light or flame detection. Therefore, as will be described below, a semiconductor film device and phototube are provided in combination with each other to form a single sensor. A photosensitive semiconductor film is deposited onto a wafer and interdigital electrode (IDE) patterning follows. Another wafer includes a top electrode and is bonded to the first wafer to form the sensor structure. This bonding is carried out in environment such that the sensor cavity between the two wafer surfaces is filled with an appropriate gas composition at suitable pressure to afford photoelectric phenomenon between top and IDE electrodes. One of the electrode structures is formed of metal, such as nickel (Ni) or gold (Au), with a work function that is suitable for deep ultraviolet (UV) responsivity. The top electrode contact may be fabricated in the form of an IDE structure and may include a photosensitive semiconductor film to further enhance sensor responsivity and functionality.

With reference to FIGS. 1-8, a light detection system 10 (see FIGS. 7 and 8) is provided. The light detection system 10 includes at least one or more light sources 20, at least one or more light detectors 30 and circuitry 40. Each of the at least one light sources 20 may be provided as a flame producing element or a burner 21 or a pilot light for a water heater or a stovetop, for example, and may be provided as a single feature (see FIGS. 1 and 2) or as two or more features (see FIGS. 3, 4 and 5).

Each of the at least one or more light detectors 30 includes a semiconductor film device 31 that is combined with a phototube 32 into a single sensor that is disposed to sense whether one or more of the light sources 20 are or are not actually producing, generating or emitting light and, if light is being produced, generated or emitted, to also sense a characteristic of that light. To this end, the at least one or more light detectors 30 are each disposed with at least one line-of-sight (LOS) to at least one corresponding light source 20.

The circuitry 40 is coupled to each of the at least one or more light detectors 30. As such, the at least one or more light detectors 30 and the circuitry 40 are configured to cooperatively identify an occurrence or the presence and the characteristic of a light emission event (e.g., a flame at the burner 21) at the at least one corresponding light source 20.

Figure 2:
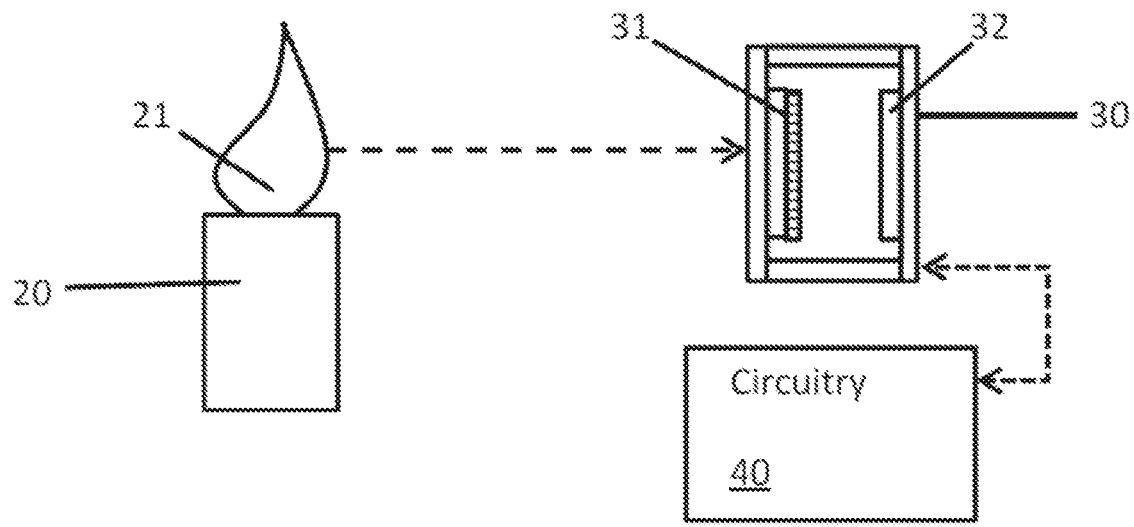
FIG. 2 is a schematic diagram illustrating a light detection system in accordance with alternative embodiments.
Figure 3:
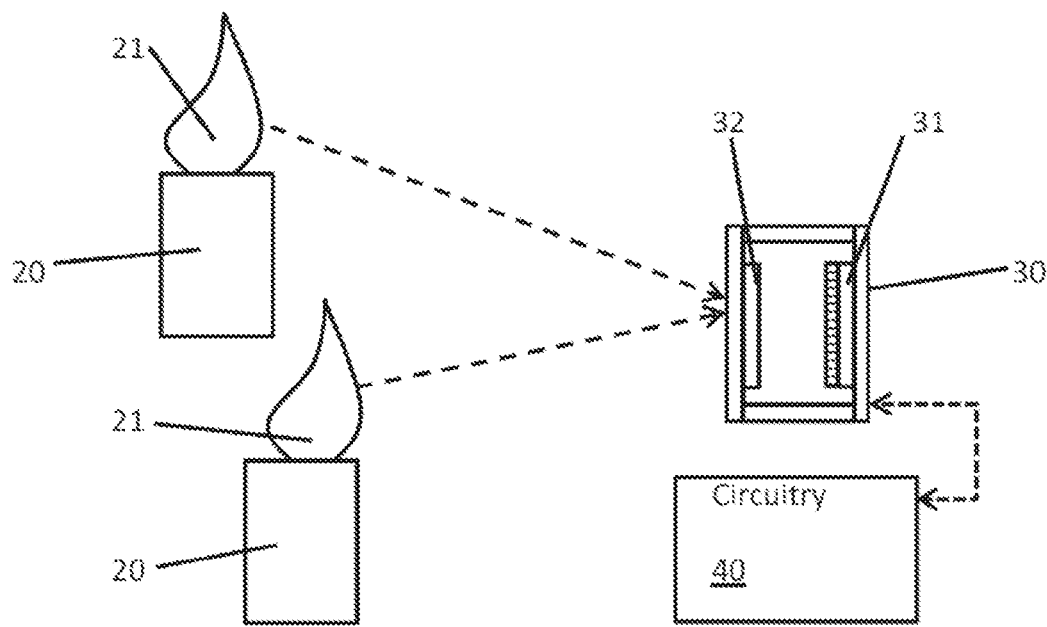
FIG. 3 is a schematic diagram illustrating the light detection system of FIG. 1 in accordance with further embodiments.
Figure 4:
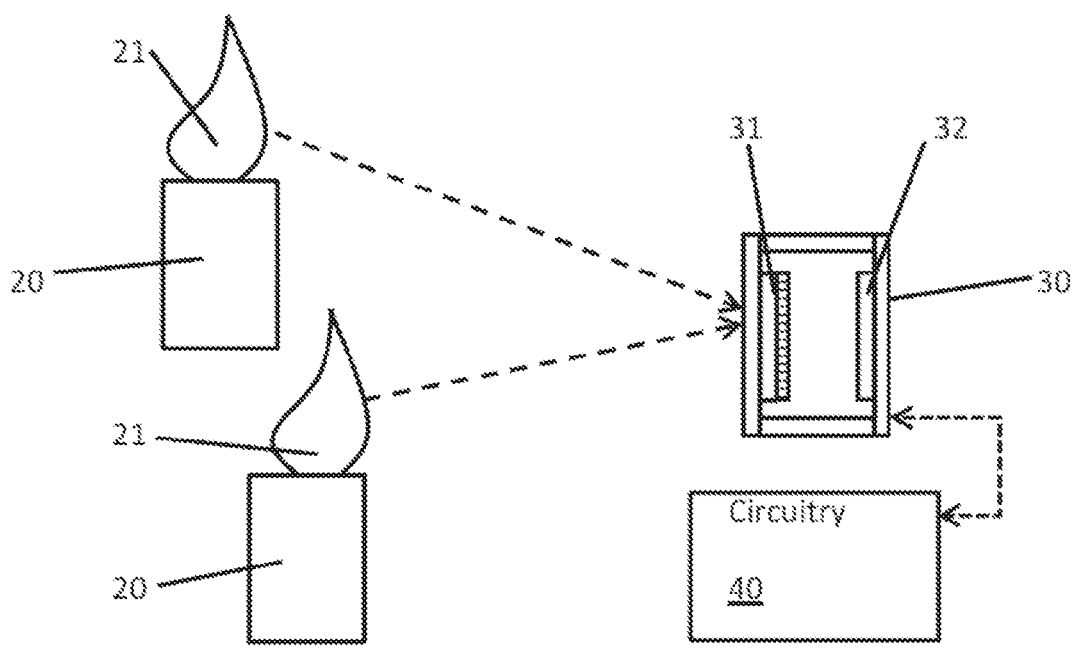
FIG. 4 is a schematic diagram illustrating the light detection system of FIG. 3 in accordance with further alternative embodiments.
Figure 5:
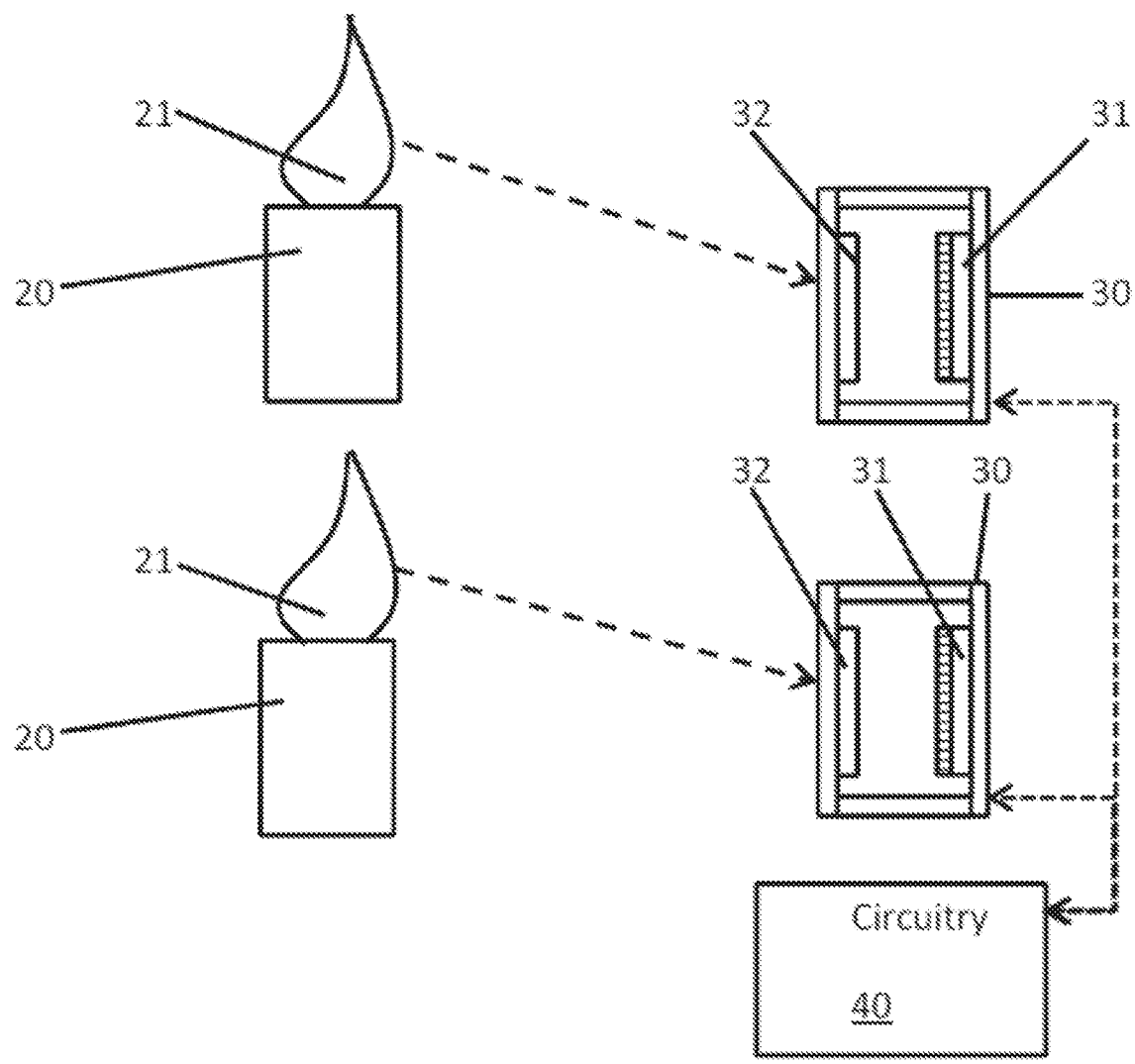
FIG. 5 is a schematic diagram illustrating the light detection system of FIG. 1 in accordance with further embodiments.
Figure 6:
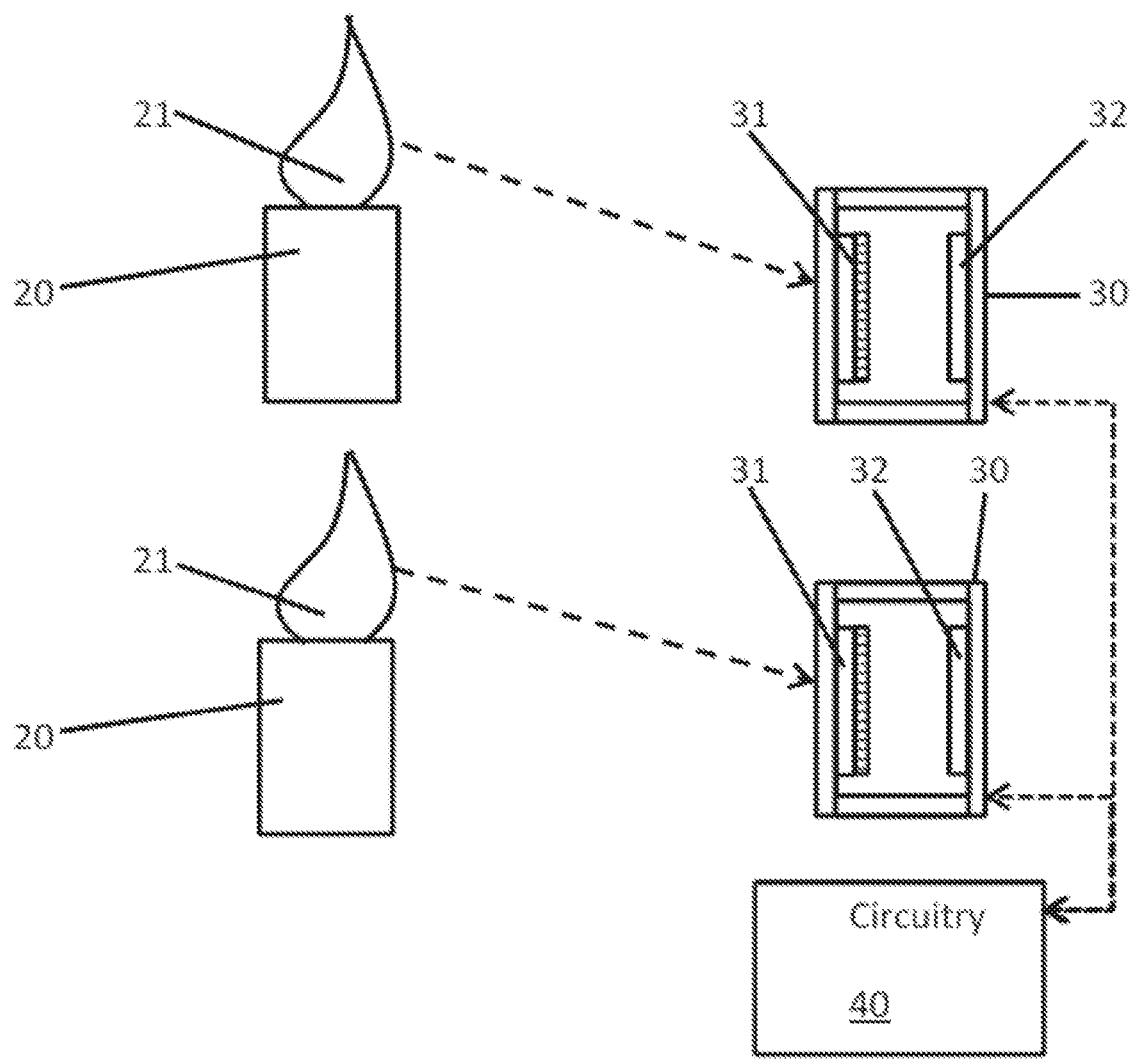
FIG. 6 is a schematic diagram illustrating the light detection system of FIG. 2 in accordance with further alternative embodiments.

To these ends, the light detection system 10 may be provided with a 1:1 ratio of one or more light sources 20 and one or more light detectors 30 (e.g., one light source 20 and one light detector 30 as shown in FIGS. 1 and 2), an N:1 ratio of one or more light sources 20 and one or more light detectors 30 (e.g., two light sources 20 and one light detector 30 as shown in FIGS. 3 and 4) or an N:N ratio of one or more light sources 20 and one or more light detectors 30 (e.g., one light source 20 and one light detector 30, two light sources 20 and two light detectors 30 as shown in FIGS. 5 and 6, three light sources 20 and three light detectors 30, etc.).

Figure 7:
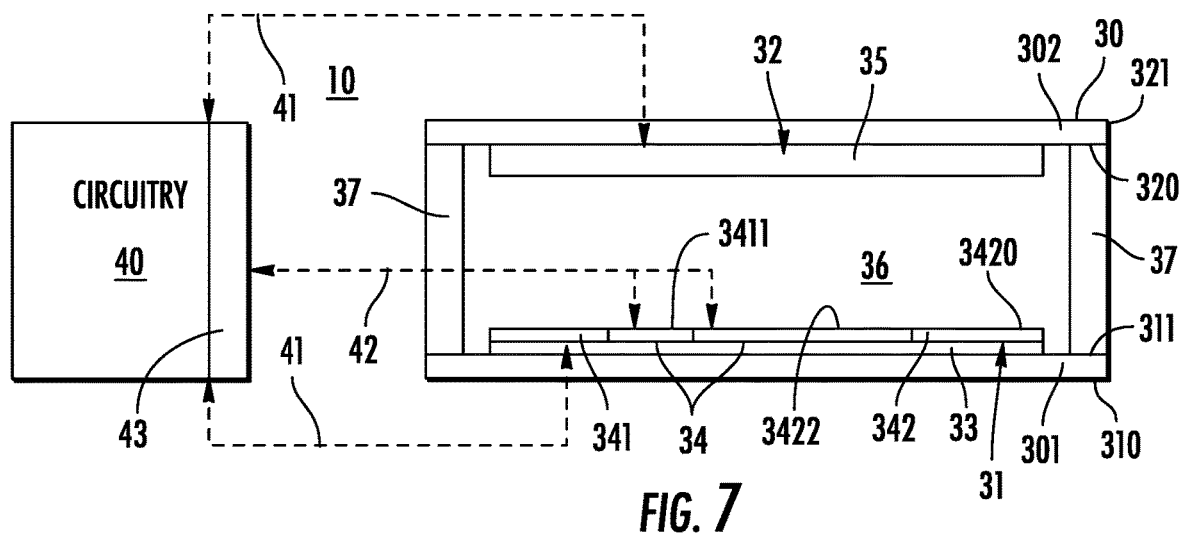
FIG. 7 is a side view of a light detector and circuitry of the light detection system of at least FIG. 1.
Figure 8:
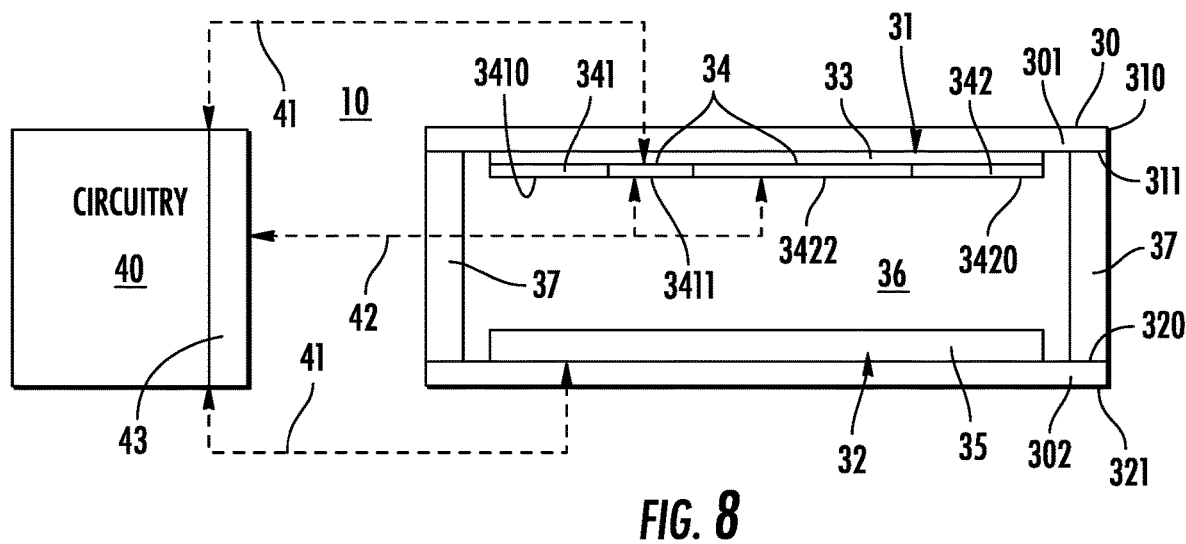
FIG. 8 is a side view of a light detector and circuitry of the light detection system of at least FIG. 2.

As shown in FIGS. 7 and 8, each one of the at least one or more light detectors 30 includes a first wafer 301 and a second wafer 302. In accordance with embodiments, the first and second wafers 301 and 302 may include silicon, oxide on silicon, quartz, sapphire, fused silica, UV transparent glass or other similar materials. In any case, at least one of the first and second wafers 301 and 302 are transparent to certain types of light, such as visible light, ultraviolet (UV) light, infrared (IR), etc. (e.g., the first wafer 301 may be formed of oxide on silicon, which is not transparent to UV light and the second wafer 302 would then have to be transparent to UV light). The first wafer 301 has a first major surface 310 and a second major surface 311 which opposes the first major surface 310. The second wafer 302 has a first major surface 320 and a second major surface 321 which opposes the first major surface 320.

A photosensitive semiconductor film 33 is disposed on a portion of the second major surface 311 of the first wafer 301 and interdigital electrodes (IDEs) 34 are partially formed on the photosensitive semiconductor film 33. A top electrode 35 is disposed on a portion of the first major surface 320 of the second wafer 302. The first and second wafers 301 and 302 are bonded such that the second major surface 311 and the first major surface 320 face each other with a cavity 36 defined therebetween. This cavity 36 may be hermetically sealed (or otherwise sealed) and is thus chargeable with a gas that is supportive of photoelectric phenomena occurring between the IDEs 34 and the top electrode 35.

In accordance with embodiments, the first and second wafers 301 and 302 may be frit bonded, anodically bonded or glued (e.g., thermosetting glue or UV curable glue) to one another. In such cases, each one of the at least one or more light detectors 30 may further include spacers 37 or bulkheads which are structurally interposed between the first and second wafers 301 and 302 about and at a distance from respective perimeters of the photosensitive semiconductor film 33, the IDEs 34 and the top electrode 35. Adhesive can be applied to opposite ends of these spacers 37 such that the opposite ends of the spacers 37 can be bonded to the first and second wafers 301 and 302.

Figure 9:
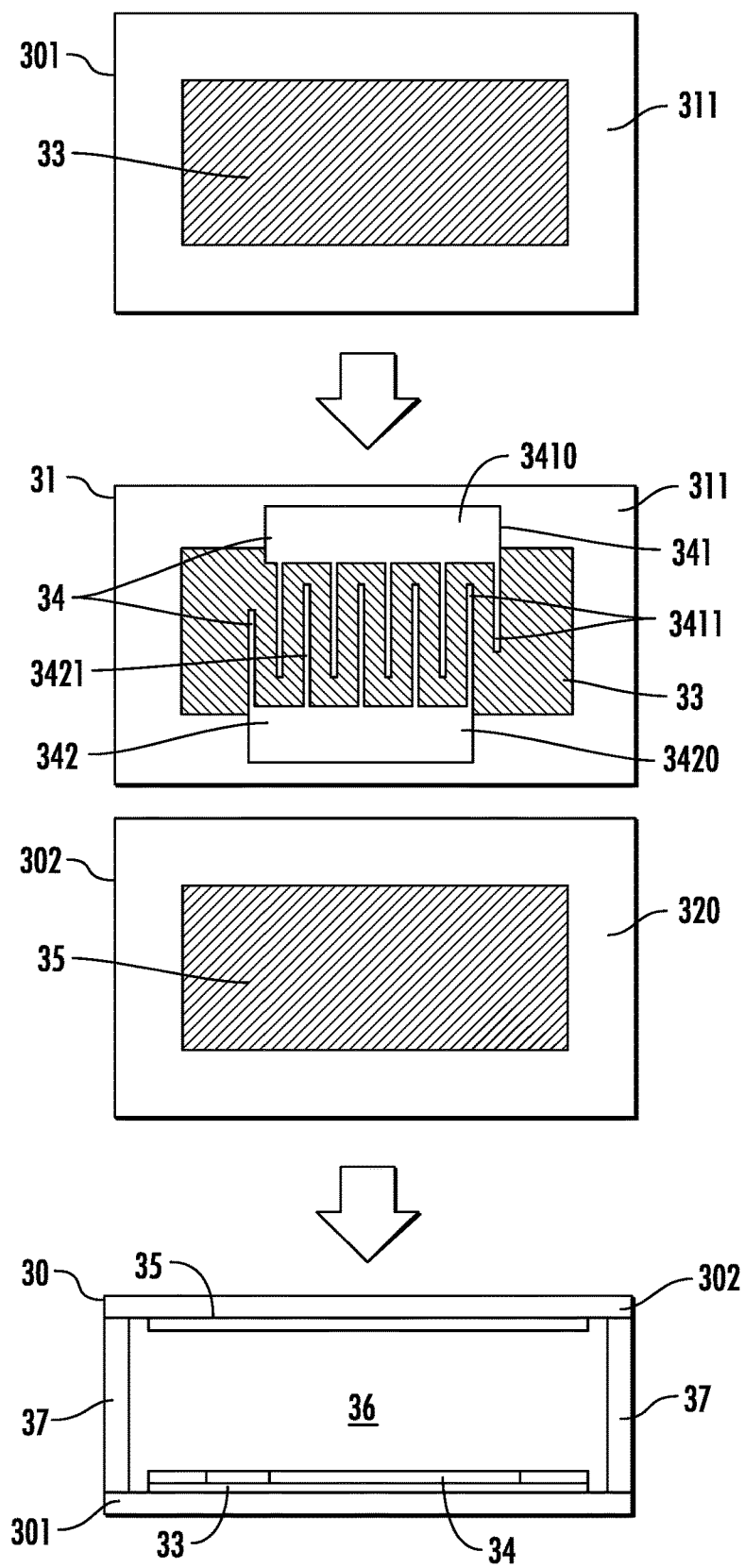
FIG. 9 is a flow diagram illustrating a fabrication process of a light detection system in accordance with embodiments.

With continued reference to FIGS. 7 and 8 and with additional reference to FIG. 9, the photosensitive semiconductor film 33 is generally planar and may have a rectangular shaped footprint. The IDEs 34 are provided as a first IDE portion 341 and a second IDE portion 342. The first IDE portion 341 includes a first base element 3410 that is elongate and lies across a portion of the photosensitive semiconductor film 33 and first digital elements 3411 that extend from a major edge of the first base element 3410. The second IDE portion 342 includes a second base element 3420 that is elongate and lies across a portion of the photosensitive semiconductor film 33 and second digital elements 3421 that extend from a major edge of the second base element 3420. The first and second digital elements 3411 and 3421 are interleaved with one another with a substantially uniform pitch. The top electrode 35 is generally planar and may be rectangular in shape. At least one or more of the IDEs 34 and the top electrode 35 includes metallic material, such as nickel (Ni) or gold (Au).

When the first and second wafers 301 and 302 are bonded, a distance between the IDEs 34 and the top electrode 35 may be anywhere from similar in magnitude to the substantially uniform pitch of the first and second digital elements 3411 and 3421 of the IDEs 34 to substantially larger than the substantially uniform pitch of the first and second digital elements 3411 and 3421 of the IDEs 34.

The circuitry 40 may include, for each one of the at least one or more light detectors 30, a first loop 41, a second loop 42 and a processor 43. The first loop 41 is coupled at opposite ends thereof to the IDE electrodes 34 and the top electrode 35, respectively, and to the processor 43. The second loop 42 is coupled at opposite ends thereof to sequential ones of the first and second digital elements 3411 and 3421, respectively, and to the processor 43.

When incident light from a light emission event of a light source passes through the second wafer 302 and impacts the IDEs 34, an electron is emitted by the IDEs 34 toward the top electrode 35. This electron (and all others which are similarly emitted) is further accelerated and amplified by voltage applied between the IDEs 34 and the top electrode 35 to thereby result in measurable current flow. This current between the IDEs 34 and the top electrode 35 is then read by the processor 43 via the first loop 41 as a current which is indicative of the light emission event occurring or being present.

On the other hand, when incident light from the light emission event of the light source passes through the second wafer 302 and impacts the photosensitive semiconductor film 33 at a location which is aligned with any of the first and second digital elements 3411 and 3421, an electron is emitted by the photosensitive semiconductor film 33 into the corresponding one of the first and second digital elements 3411 and 3421. This electron (and all others which are similarly emitted) is read by the processor 43 via the second loop 42 as a current differential between the first and second IDE portions 341 and 342 that is indicative of the characteristic of the light emission event (i.e., a frequency or wavelength of the light emitted by the light emission event).

Alternatively, when the first wafer 301 includes UV transparent materials, such as quartz, fused silica, sapphire or similar materials, the incident light is directed through the first wafer 301 onto the photosensitive semiconductor film 33 and impacts the photosensitive semiconductor film 33 at a location which is aligned with any of the first and second digital elements 3411 and 3421. An electron is then emitted by the photosensitive semiconductor film 33 into the corresponding one of the first and second digital elements 3411 and 3421. This electron (and all others which are similarly emitted) is read by the processor 43 via the second loop 42 as a current differential between the first and second IDE portions 341 and 342 that is indicative of the characteristic of the light emission event (i.e., a frequency or wavelength of the light emitted by the light emission event).

With continued reference to FIG. 9, a method of assembling each of the at least one of the light detectors 30 is provided. As shown in FIG. 9, the method initially includes disposing the photosensitive semiconductor film 33 on the portion of the second major surface 311 of the first wafer 301 by, for example, depositional processing, epitaxial growth processing or other similar processing. The method then includes partially forming the interdigital electrodes (IDEs) 34 on the photosensitive semiconductor film 33 by depositional processing and/or subsequent lithographic processing or etching (e.g., in one case, the depositional processing may be done through shadow-masking, in which case subsequent lithographic processing or etching is spurious). The method also includes disposing the top electrode 35 on the portion of the first major surface 320 of the second wafer 302 by, for example, depositional processing, epitaxial growth processing or other similar processing and/or subsequent lithographic processing or etching. At this point, the method includes bonding the first and second wafers 301 and 302 and charging the cavity 36 as described above.

Figure 10:
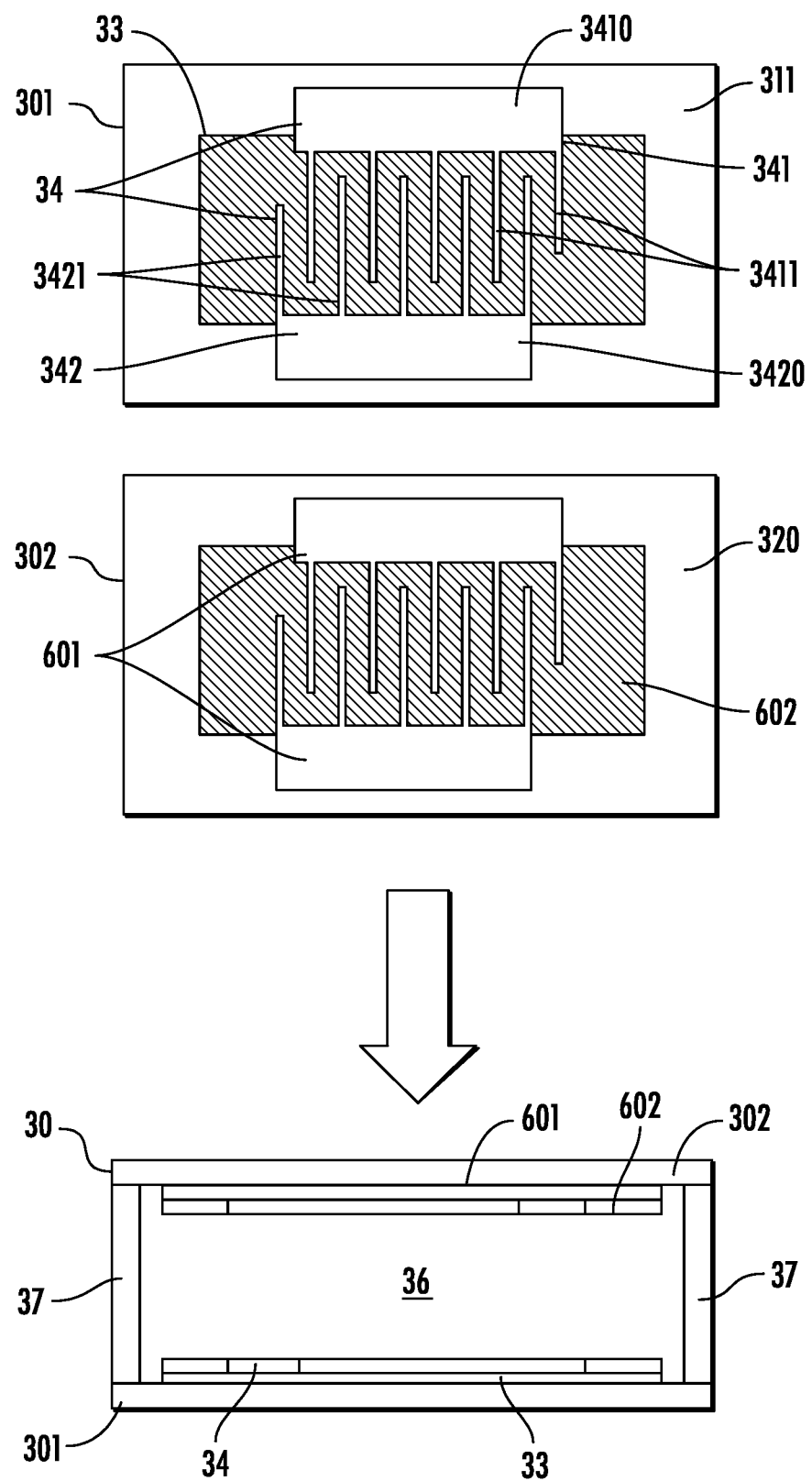
FIG. 10 is a flow diagram illustrating a fabrication process of a light detection system in accordance with further embodiments.

In accordance with alternative embodiments and, with reference to FIG. 10, the method may include forming the top electrode 35 on the portion of the first major surface 320 of the second wafer 302 as an IDE structure 601. Here, the IDE structure 601 may be formed by, for example, depositional processing, epitaxial growth processing or other similar processing of the top electrode 35 and subsequent lithographic processing or etching. In this case, an additional photosensitive semiconductor film 602 may be interposed between the IDE structure 601 of the top electrode 35 and the first major surface 320 of the second wafer 302. It is to be understood that, in the embodiment of FIG. 10, at least one of the first wafer 301 or the second wafer 302 needs to be transparent to UV (e.g., quartz, fused silica, sapphire or UV transparent glass). The other may be provided as an oxide on silicon wafer.

The description provided herein relates to a low cost, scalable flame or light sensor with best-in-class solar radiation rejection, responsivity, dynamic range and response time for commercial and residential fire safety solutions. In addition, it provides an attractive, low cost alternative to semiconductor solid state devices and photoionization tubes employed in industrial and boiler monitoring applications.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A light detection system for association with a light source, the light detection system comprising:
a light detector comprising a semiconductor film device and a phototube device, the light detector being disposed with at least one line-of-sight (LOS) to the light source; and
circuitry coupled to the light detector, the light detector and the circuitry being configured to cooperatively identify a presence and a characteristic of a light emission event at the light source,
wherein the light detector comprises:
a first wafer having opposed first and second major surfaces;
a photosensitive semiconductor film disposed on the second major surface of the first wafer;
interdigital electrodes (IDEs) partially formed on the photosensitive semiconductor film;
a second wafer having opposed first and second major surfaces; and
a top electrode disposed on the first major surface of the second wafer,
the first and second wafers being bonded such that the respective second and first major surfaces of the first and second wafers face each other with a cavity defined between the respective second and first major surfaces of the first and second wafers,
the cavity being chargeable with gas supportive of photoelectric phenomena between the IDEs and the top electrode, and
the circuitry identifies the presence and the characteristic of incident light passing through the second wafer and impacting the IDEs and of incident light passing through the first wafer and impacting the photosensitive semiconductor film.

2. The light detection system according to claim 1, wherein the first and second wafers each comprise at least one or more of silicon, oxide on silicon, quartz, sapphire, fused silica and ultraviolet (UV) transparent glass.

3. The light detection system according to claim 1, wherein the cavity is hermetically sealed.

4. The light detection system according to claim 1, wherein the first and second wafers are frit bonded, anodically bonded or glued.

5. The light detection system according to claim 1, wherein a distance between the IDEs and the top electrode is anywhere from being equal to a pitch of the IDEs to being substantially larger than the pitch of the IDEs.

6. The light detection system according to claim 1, wherein both of the IDEs and the top electrode are metallic.

7. A light detection system for association with a light source, the light detection system comprising:
a light detector disposed with at least one line-of-sight (LOS) to the light source; and
circuitry coupled to the light detector, the light detector and the circuitry being configured to cooperatively identify a presence and a characteristic of a light emission event at the light source,
wherein:
the light detector comprises first and second wafers, the first wafer having opposed first and second major surfaces, a photosensitive semiconductor film disposed on the second major surface of the first wafer and interdigital electrodes (IDEs) partially formed on the photosensitive semiconductor film and the second wafer having opposed first and second major surfaces and a top electrode disposed on the first major surface of the second wafer,
the first and second wafers are bonded such that the respective second and first major surfaces of the first and second wafers face each other with a cavity defined between the respective second and first major surfaces of the first and second wafers,
the cavity is chargeable with gas supportive of photoelectric phenomena between the IDEs and the top electrode, and
the top electrode has an IDE structure and the light detector further comprises a photosensitive semiconductor film interposed between the IDE structure of the top electrode and the first major surface of the second wafer.

8. A light detector, comprising:
a first wafer having opposed first and second major surfaces;
a photosensitive semiconductor film disposed on the second major surface of the first wafer;
interdigital electrodes (IDEs) partially formed on the photosensitive semiconductor film;
a second wafer having opposed first and second major surfaces; and
a top electrode disposed on the first major surface of the second wafer,
the first and second wafers being bonded such that the respective second and first major surfaces of the first and second wafers face each other with a cavity defined between the respective second and first major surfaces of the first and second wafers,
the cavity being chargeable with gas supportive of photoelectric phenomena between the IDEs and the top electrode, and
the top electrode having an IDE structure and the light detector further comprising a photosensitive semiconductor film interposed between the IDE structure of the top electrode and the first major surface of the second wafer.

9. The light detector according to claim 8, wherein at least the first and second wafers have similar coefficients of thermal expansion (CTEs).

10. The light detector according to claim 8, wherein the first and second wafers each comprise at least one or more of silicon, oxide on silicon, quartz, sapphire, fused silica and ultraviolet (UV) transparent glass.

11. The light detector according to claim 8, wherein the cavity is hermetically sealed.

12. The light detector according to claim 8, wherein the first and second wafers are frit bonded, anodically bonded or glued.

13. The light detector according to claim 8, wherein a distance between the IDEs and the top electrode is anywhere from being equal to a pitch of the IDEs to being substantially larger than the pitch of the IDEs.

14. The light detector according to claim 8, wherein both of the IDEs and the top electrode are metallic.

15. A method of assembling a light detector, comprising:
disposing a photosensitive semiconductor film on a major surface of a first wafer;
partially forming interdigital electrodes (IDEs) on the photosensitive semiconductor film;
disposing a top electrode on a major surface of a second wafer;

bonding the first and second wafers such that the respective major surfaces face each other with a cavity defined therebetween;
charging the cavity with gas supportive of photoelectric phenomena between the IDEs and the top electrode; and
positioning the light detector to identify a presence and a characteristic of incident light passing through the second wafer and impacting the IDEs and of incident light passing through the first wafer and impacting the photosensitive semiconductor film.

\* \* \* \* \*